United States Patent
Lee

(10) Patent No.: US 8,831,434 B2
(45) Date of Patent: Sep. 9, 2014

(54) COMPUTER AND COMPUTER DATA TRANSMISSION SYSTEM

(75) Inventor: Bing-Heng Lee, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 117 days.

(21) Appl. No.: 13/531,386

(22) Filed: Jun. 22, 2012

(65) Prior Publication Data

US 2013/0148974 A1 Jun. 13, 2013

(30) Foreign Application Priority Data

Dec. 12, 2011 (TW) .............................. 100145834 A

(51) Int. Cl.
*H04B 10/00* (2013.01)
(52) U.S. Cl.
USPC ........................................... 398/140; 398/139
(58) Field of Classification Search
USPC ......................................... 398/138–140, 164
See application file for complete search history.

(56) References Cited

U.S. PATENT DOCUMENTS

| | | | | |
|---|---|---|---|---|
| 5,557,754 A * | 9/1996 | Sone et al. | ...................... | 710/107 |
| 6,650,808 B1 * | 11/2003 | Vujcic | .............................. | 385/24 |
| 2002/0178319 A1 * | 11/2002 | Sanchez-Olea | ............... | 710/305 |
| 2008/0222351 A1 * | 9/2008 | Verdiell et al. | ................. | 711/104 |
| 2011/0116807 A1 * | 5/2011 | Park et al. | ...................... | 398/164 |

* cited by examiner

*Primary Examiner* — Dalzid Singh
(74) *Attorney, Agent, or Firm* — Novak Druce Connolly Bove + Quigg LLP

(57) ABSTRACT

A computer data transmission system includes a CPU, a photoelectrical conversion module electrically connected to the CPU, a plurality of I/O interface cards, and a plurality of first optical fibers. The photoelectrical conversion module includes a plurality of photoelectrical conversion units. Each I/O interface card includes at least one photoelectrical conversion unit for converting electrical signals to optical signals or converting optical signals to electrical signals. The first optical fibers connect the photoelectrical conversion units of the I/O interface cards and the photoelectrical conversion units of the photoelectrical conversion module. The photoelectrical conversion unit of the photoelectrical conversion module receives electrical signals outputted by the CPU, and convert the electrical signals to optical signals. The converted optical signals are transmitted to the photoelectrical conversion unit of the I/O interface card, and the photoelectrical conversion unit of the I/O interface card converts the optical signals to electrical signals.

12 Claims, 2 Drawing Sheets

COMPUTER AND COMPUTER DATA TRANSMISSION SYSTEM

BACKGROUND

1. Technical Field

The present disclosure relates generally to computer data transmission systems, especially to a computer data transmission system and a computer using the computer data transmission system.

2. Description of Related Art

Many computers include a plurality I/O interface cards to connect to various peripheral devices, for data transmission and exchange. As the computer technology progresses over time, a speed of a CPU of the computer may reach more than 20 Gb/s, however, the peripheral devices obtain a lower speed than the speed of the CPU due to the data being required to be transmitted via a long electrical wire, which results in the slowing down of processing speed of the computer.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
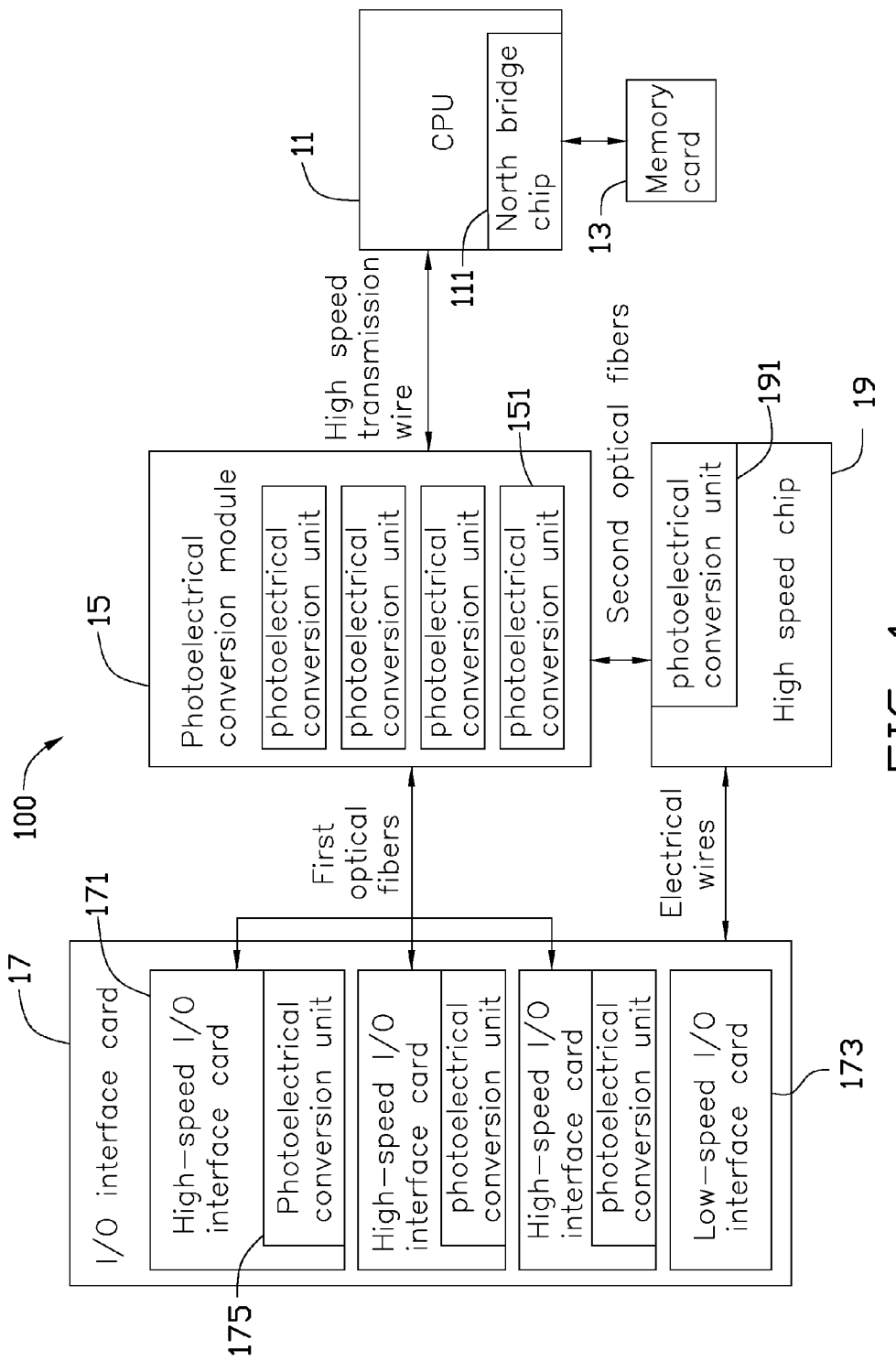
FIG. 1 is a block diagram of an embodiment of a computer data transmission system.
Figure 2:
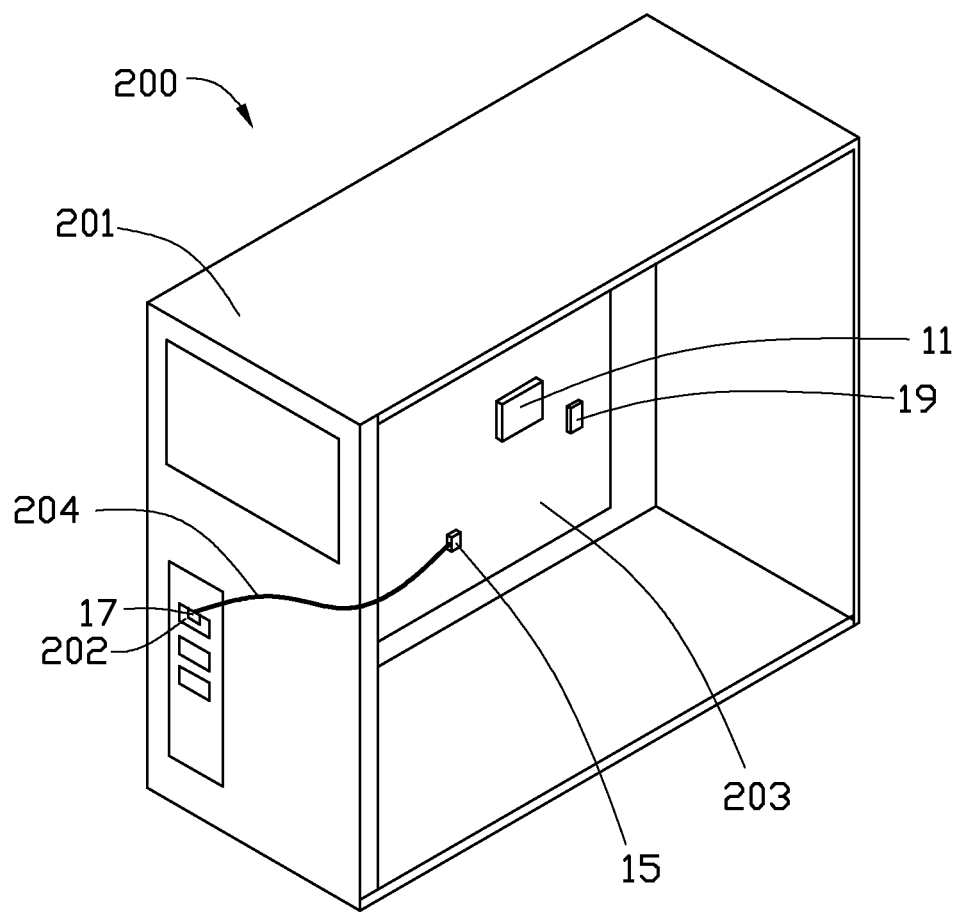
FIG. 2 is a partial, isometric view of an embodiment of a computer using the computer data transmission system shown in FIG. 1.

FIGS. 1 and 2 show one embodiment of a computer data transmission system 100. The computer data transmission system 100 achieves its functionalities with a computer 200 (only shown in a partial isometric view in FIG. 2). The computer 200 includes a housing 201, a plurality of I/O ports 202, a main circuit board 203, and the computer data transmission system 100. The housing 201 is substantially cuboid. The I/O ports 202 are mounted on a sidewall of the housing 201. The main circuit board 203 is an integrated circuit panel fixed to an inner surface of a sidewall of the housing 201. The computer data transmission system 100 is received in the housing 201 for transmitting data. In the illustrated embodiment, one sidewall of the housing 201 is omitted for showing the main circuit board 203. In an another embodiment, the I/O ports 202 can be mounted on other sidewalls of the housing 201, such as a back sidewall for example.

The computer data transmission system 100 includes a CPU 11, a memory card 13, a photoelectrical conversion module 15, a plurality of I/O interface cards 17 (only one I/O interface card is shown in FIG. 2), a high speed chip 19 and a plurality of first optical fibers 204. The CPU 11, the memory card 13 (shown in FIG. 1), the photoelectrical conversion module 15, and the high speed chip 19 are integrated on the main circuit board 203. The I/O interface cards 17 are located in the I/O ports 202. The first optical fibers 204 connect the I/O interface cards 17 and the photoelectrical conversion module 15. For the sake of showing the first optical fibers 204 in the present embodiment, the first optical fibers 204 are seen as being fed to an outside of the housing 201 as shown in FIG. 2. In other embodiments, the first optical fibers 204 can be arranged in the housing 201 in a prescribed arrangement. In the illustrated embodiment, the memory card 13 is integrated in the CPU 11. The CPU 11 includes a north bridge chip 111 (shown in FIG. 1) electrically connected to the memory card 13. The north bridge chip 111 controls the memory card 13 to store data.

The photoelectrical conversion module 15 connects with the CPU 11 via a high speed transmission wire (shown but not labeled in FIG. 1). The photoelectrical conversion module 15 includes a plurality of photoelectrical conversion units 151. The photoelectrical conversion units 151 convert a plurality of electrical signals to a plurality of optical signals or convert the optical signals to the electrical signals, vice versa. In the illustrated embodiment, the signal transmission speed between each photoelectrical conversion unit 151 and the CPU 11 is 20 GHz. The photoelectrical conversion units 151 use a laser diode (not shown) for emitting optical signals.

The high speed chip 19 connects to the photoelectrical conversion module 15 via a plurality of second optical fibers, for transmitting optical signals between the high speed chip 19 and the photoelectrical conversion module 15. The high speed chip 19 includes at least one photoelectrical conversion unit 191, for converting optical signals to electrical signals or converting electrical signals to optical signals, vice versa. In the illustrated embodiment, there is one photoelectrical conversion unit 191 in the high speed chip 19.

The I/O interface cards 17 includes at least one high-speed I/O interface card 171 and at least one low-speed I/O interface card 173 (only one low-speed I/O interface card 173 is shown in FIG. 2). The high-speed I/O interface card 171 connects with the photoelectrical conversion module 15 via the first optical fibers 204, for allowing the exchanging of optical signals between the high-speed I/O interface cards 171 and the photoelectrical conversion module 15. The high-speed I/O interface card 171 includes a photoelectrical conversion unit 175. The low-speed I/O interface card 173 connects with the high speed chip 19 via a plurality of electrical wires, for allowing exchanging of electrical signals between the low-speed I/O interface cards 173 and the high speed chip 19. In the illustrated embodiment, the high-speed I/O interface card 171 uses PCIe interface standard to achieve a high transmission speed, which enable the peripheral devices requiring of higher transmission speed, such as a display card for example, to be connected to the high-speed I/O interface cards 171 for data exchange. The low-speed I/O interface card 173 uses the PCI interface standard to achieve a lower transmission speed than the high-speed I/O interface card 171, which enable the peripheral devices requiring a lower transmission speed, such as an USB for example, to be connected to the low-speed I/O interface cards for data exchange. In the illustrated embodiment, there are three high-speed I/O interface cards 171 and a low-speed I/O interface card 173.

In use, when a peripheral device is connected to one of the high-speed I/O interface card 171 to exchange data with the computer 200, the CPU 11 processes the data into a plurality of electrical signals, and the electrical signals are outputted to the photoelectrical conversion module 15 via the high speed transmission wire. The photoelectrical conversion units 151 of the photoelectrical conversion module 15 convert the electrical signals to a plurality of optical signals, and the converted optical signals are emitted to the high-speed I/O interface card 171 via the first optical fibers 204. The photoelectrical conversion unit 175 of the high-speed I/O interface card 171 receives the optical signals, and converts the optical signals to electrical signals to the peripheral device. Thus the data of the computer 200 is sent to the peripheral device.

The data of the peripheral device is processed into electrical signals by an integrated circuit of the I/O interface card 17, and the electrical signals are converted to optical signals by the photoelectrical conversion unit 175. The optical signals are emitted to the photoelectrical conversion module 15 via the first optical fibers 204. The photoelectrical conversion unit 151 converts the optical signals to electrical signals, and the electrical signals are transmitted to the CPU 11 via the high speed transmission wire. Thus the data of the peripheral device is sent to the computer 200.

When a peripheral device is connected to one of the low-speed I/O interface cards 173 to send data with the computer 200, the CPU 11 processes the data to electrical signals, and the electrical signals are outputted to the photoelectrical conversion module 15 via the high speed transmission wires. The photoelectrical conversion units 151 of the photoelectrical conversion module 15 convert the electrical signals to a plurality of optical signals, and the converted optical signals are emitted to the photoelectrical conversion unit 191 of the high speed chip 19 via the second optical fibers. The photoelectrical conversion unit 191 receives the optical signals, and reduces a frequency of the optical signals, and then converts the optical signals to electrical signals. The electrical signals are transmitted to the low-speed I/O interface card 173 via the electrical wires. Thus the data of the computer 200 is sent to the peripheral device.

The data of the peripheral device is processed to electrical signals by an integrated circuit of the I/O interface card 17, and the electrical signals are transmitted to the photoelectrical conversion unit 191 of the high speed chip 19 via the electrical wires. The electrical signals are converted to optical signals by the photoelectrical conversion unit 191, and the photoelectrical conversion unit 191 of the high speed chip 19 increases the frequency of the optical signals, and then emits the optical signals to the photoelectrical conversion module 15 via the second optical fibers. The photoelectrical conversion unit 151 converts the optical signals to electrical signals, and the electrical signals are transmitted to the CPU 11 via the high speed transmission wire. Thus the data of the peripheral device is sent to the computer 200.

Because the photoelectrical conversion module 15 and the photoelectrical conversion unit 175 are set or configured in the computer data transmission system 100 for converting optical signal to electrical signals or converting electrical signals to optical signals, vice versa, thus the I/O interface cards 17 can be connected to the photoelectrical conversion module 15 via the first optical fibers 204. The electrical signals are converted to optical signals to be transmitted via the first optical fibers 204, to achieve a higher transmission speed and provide time savings. A distance between the CPU 11 and the photoelectrical conversion module 15 is shorter, thus it spends a shorter amount of time for the electrical signals to transmit on the high speed transmission wire. The computer 200 is suitable for exchanging data with the peripheral devices requiring high transmission speed or low transmission speed, and it is convenient to use the computer 200.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A computer data transmission system for a computer, comprising:
   a CPU;
   a photoelectrical conversion module electrically connected to the CPU, the photoelectrical conversion module comprising a plurality of photoelectrical conversion units configured to convert electrical signals to optical signals or convert optical signals to electrical signals;
   a plurality of I/O interface cards comprising at least one high-speed I/O interface card and at least one low-speed I/O interface card, and each high-speed I/O interface card comprising one of the photoelectrical conversion units;
   a plurality of first optical fibers connecting the photoelectrical conversion units of the high-speed I/O interface cards and the photoelectrical conversion units of the photoelectrical conversion module; and
   a high speed chip connected to the photoelectrical conversion module via a plurality of second optical fibers configured to transmit optical signals between the high speed chip and the photoelectrical conversion module, the high speed chip comprising at least one of the photoelectrical conversion units,
   wherein the at least one high-speed interface card is connected with the photoelectrical conversion module via the first optical fibers; the at least one low-speed I/O interface card is electrically connected to the high speed chip, the photoelectrical conversion module receives a plurality of electrical signals outputted by the CPU, and the photoelectrical conversion units of the photoelectrical conversion module convert the electrical signals to a plurality of optical signals; the converted optical signals are transmitted to the photoelectrical conversion unit of the high-speed I/O interface card, and the photoelectrical conversion unit of the high-speed I/O interface card converts the optical signals to electrical signals for transmitting to a peripheral device.

2. The computer data transmission system of claim 1, further comprises a memory card electrically connected to the CPU, wherein the CPU comprises a north bridge chip 111 electrically connected to the memory card; the north bridge chip controls the memory card to store a plurality of data.

3. The computer data transmission system of claim 1, wherein a plurality of electrical wires connect the at least one low-speed I/O interface card and the high speed chip.

4. The computer data transmission system of claim 1, wherein the at least one high-speed I/O interface card uses PCIe interface standard to achieve a higher transmission speed, the at least one low-speed I/O interface card use PCI interface standard to achieve a lower transmission speed than the higher transmission speed of the high-speed I/O interface card.

5. The computer data transmission system of claim 1, wherein the at least one photoelectrical conversion unit of the high speed chip reduces a frequency of the optical signals transmitted by the second optical fibers, and then converts the optical signals to electrical signals when data is sent from the computer to the peripheral device; and the at least one photoelectrical conversion unit of the high speed chip converts the electrical signals transmitted by the electrical wires to optical signals, and then increases the frequency of the optical signals to emit to the second optical fibers when data is sent from the peripheral device to the computer.

6. The computer data transmission system of claim 1, wherein the CPU is connected with the photoelectrical conversion module via a high speed transmission wire.

7. A computer, comprising:
   a housing comprising a sidewall, and an inner sidewall;
   a plurality of I/O ports mounted on the sidewall of the housing;
   a main circuit board fixed on the inner sidewall of the housing; and a computer data transmission system, comprising:
- a CPU integrated on the main circuit board;
- a photoelectrical conversion module integrated on the main circuit board, and electrically connected to the CPU, the photoelectrical conversion module comprising a plurality of photoelectrical conversion units configured to convert electrical signals to optical signals or convert optical signals to electrical signals;
- a plurality of I/O interface cards located in the I/O ports, and comprising at least one high-speed I/O interface card and at least one low-speed I/O interface card; each high-speed I/O interface card comprising one of the photoelectrical conversion units;
- a plurality of first optical fibers connecting the photoelectrical conversion units of the high-speed I/O interface cards and the photoelectrical conversion units of the photoelectrical conversion module; and
- a high speed chip connected to the photoelectrical conversion module via a plurality of second optical fibers configured to transmit optical signals between the high speed chip and the photoelectrical conversion module, the high speed chip comprising at least one of the plurality of photoelectrical conversion units, wherein the at least one high-speed interface card is connected with the photoelectrical conversion module via the first optical fibers; the at least one low-speed I/O interface card is electrically connected to the high speed chip, the photoelectrical conversion module receives a plurality of electrical signals outputted by the CPU, and the photoelectrical conversion units of the photoelectrical conversion module convert the electrical signals to optical signals; the converted optical signals are transmitted to the photoelectrical conversion unit of the high-speed I/O interface card, and the photoelectrical conversion unit of the high-speed I/O interface card converts the optical signals to electrical signals.

8. The computer of claim 7, wherein the computer data transmission system further comprises a memory card electrically connected to the CPU, the CPU comprises a north bridge chip electrically connected to the memory card; the north bridge chip controls the memory card to store data.

9. The computer of claim 8, wherein a plurality of electrical wires connect the at least one low-speed I/O interface card and the high speed chip.

10. The computer of claim 8, wherein the at least one high-speed I/O interface card uses PCIe interface standard to achieve a higher transmission speed, the at least one low-speed I/O interface card use PCI interface standard to achieve a lower transmission speed than the transmission speed of the high-speed I/O interface card.

11. The computer of claim 8, wherein the at least one photoelectrical conversion unit of the high speed chip reduces a frequency of the optical signals transmitted by the second optical fibers, and then converts the optical signals to electrical signals when data is sent from the computer to a peripheral device; and the at least one photoelectrical conversion unit of the high speed chip converts the electrical signals transmitted by the electrical wires to optical signals, and then increases the frequency of the optical signals to emit to the second optical fibers when data is sent from the peripheral device to the computer.

12. The computer of claim 7, wherein the CPU is connected with the photoelectrical conversion module via a high speed transmission wire.

* * * * *